United States Patent

Trask et al.

[15] 3,658,476

[45] Apr. 25, 1972

[54] METHOD FOR PRODUCING A GRAPHITE ARTICLE

[72] Inventors: Robert B. Trask, Model City, N.J.; Mark J. Smith, Wilson, N.Y.

[73] Assignee: Airco, Inc., New York, N.Y.

[22] Filed: May 19, 1970

[21] Appl. No.: 37,480

Related U.S. Application Data

[63] Continuation of Ser. No. 796,295, Jan. 22, 1969, abandoned, which is a continuation of Ser. No. 544,364, Apr. 22, 1966, abandoned.

[52] U.S. Cl.................................23/209.1, 23/209.2, 264/29
[51] Int. Cl. ..............................................C01b 31/04
[58] Field of Search................23/209.1, 209.2; 264/29, 105; 136/121, 122; 252/502; 260/649

[56] References Cited

UNITED STATES PATENTS

| | | | |
|---|---|---|---|
| 2,500,209 | 3/1950 | Shea et al. | 264/105 |
| 2,683,107 | 7/1954 | Juel | 264/29 X |

FOREIGN PATENTS OR APPLICATIONS

| | | | |
|---|---|---|---|
| 485,658 | 8/1952 | Canada | 264/29 |

OTHER PUBLICATIONS

Hubbard " Kirk–Othmer Encyclopedia of Chemical Technology" 2nd Ed., Vol. 5, 1965, pages 289– 297

*Primary Examiner*—Edward J. Meros
*Attorney*—H. Hume Mathews and Edmund W. Bopp

[57] ABSTRACT

Graphite articles are produced by mixing a carbonaceous filler material and a binder of pitch with 5 to 50 percent by weight of the pitch of a chlorinated biphenyl or a chlorinated terphenyl, forming the raw batch composition thus obtained into an article, baking the article to carbonize the binder, and firing the thus baked article to graphitize it.

2 Claims, No Drawings

METHOD FOR PRODUCING A GRAPHITE ARTICLE

This application is a continuation of our copending application Ser. No. 796,295, filed Jan. 22, 1969, now abandoned, which is, in turn, a continuation of our application Ser. No. 544,364, filed Apr. 22, 1966, also now abandoned.

This invention relates to carbonaceous articles and methods of making the same. More particularly, the invention relates to carbonaceous articles, such as graphite electrodes and graphite nipple stocks which have reduced coefficients of expansion and increased flexural strengths, and methods of making the same.

Shaped graphite articles are customarily made by mixing a crushed carbonaceous aggregate filler material comprised of such carbons as calcined petroleum coke, anthracite charcoal, electrode carbon scrap, metallurgical coke, lampblack, natural graphite, or the like, with a sufficient amount of pitch to serve as a binder. This mixture is usually made above the melting point of the pitch to secure distribution of the pitch throughout the carbon aggregate. Small amounts of lubricant, such as black oil, may be added shortly before the mixing is completed, especially where the articles involved are to be formed by extrusion molding. The mixture is cooled somewhat to congeal the binder, after which it is then compressed or extruded into the desired shape, then baked to carbonize the binder, after which the baked carbon body may be subjected to higher temperature to graphitize the carbon and the carbonized binder which holds it together.

Constant efforts are being made throughout the graphite industry to improve the physical and electrical properties of graphite articles. The subject matter of this invention resides in the discovery that the addition of relatively small amounts of chlorinated polyphenyls to the carbonaceous ingredients of the article to be formed prior to the mixing of said ingredients results in the finished article, after graphitization, having a substantially reduced coefficient of thermal expansion and increased flexural strength. This phenomena occurs even though substantially all, if not entirely all, of the chlorine in the chlorinated polyphenyl is give off during the baking and graphitizing of the carbonaceous article.

It is accordingly an object of this invention to provide an improved carbonaceous article of manufacture and a method of making the same.

It is another object of the invention to provide an improved graphite body having a low coefficient of thermal expansion and/or high flexural strength, and a method of making the same.

It is yet another object of this invention to provide an improved graphite electrode having a low coefficient of thermal expansion and/or high flexural strength, and a method of making the same.

It is another object of the invention to provide a raw batch composition which when processed into a graphite body by conventional graphitizing techniques will form a finished graphite body having a low coefficient of thermal expansion and high flexural strength.

Other objects and advantages of the invention will become apparent as the description proceeds.

As previously noted, graphite bodies formed from raw batch compositions which contain a chlorinated polyphenyl additive exhibit improved physical properties. The graphite bodies will of course be useful in many applications. As illustrative of the improved properties in such bodies, graphite electrodes of the type normally used as industrial furnace operations were prepared and tested. The electrodes tested were formed from the raw batch composition as set forth in Table I.

TABLE I

| Ex. No. | Petroleum Coke Filler (p.p.h.) | Pitch (p.p.h.) | Binder Additive Type | p.p.h. | Wt. % of Binder |
|---|---|---|---|---|---|
| 1 | 100 | 36 | Aroclor 5460 | 5.0 | 12.2 |
| 2 | 100 | 37 | Aroclor 1242 | 5.0 | 11.9 |
| 3 | 100 | 37 | Aroclor 1260 | 5.0 | 11.9 |
| 4 | 100 | 22 | Aroclor 5460 | 22.0 | 50.0 |
| 5 | 100 | 39 | None | 0.0 | 0.0 |
| 6 | 100 | 40 | None | 0.0 | 0.0 |
| 7 | 100 | 41 | None | 0.0 | 0.0 |
| 8 | 100 | 37 | Unchlorinated biphenyl | 5.0 | 11.9 |

The Aroclor compounds in the above table are chlorinated polyphenyls available commercially from Monsanto Chemical Company and are coded as to type. When the first two digits are 12, the material is a biphenyl. When they are 54, the material is a terphenyl. The second set of digits indicates the weight percent of chlorine in the compounds.

In the manufacture of graphite electrodes, all raw materials are first weighed out and placed in a suitable mixer. The mixing is generally done at a temperature of 70° to 200° C, depending on the melting point of the pitch binder, and for a time of 20 to 120 minutes. In the case of the mixes containing chlorinated polyphenyls, it is important that complete miscibility of the pitch and chlorinated polyphenyl is obtained. Near the end of the mixing cycle, small amounts of lubricant may be added, especially for extrusion molding of the mix. The mixture is then compressed or extruded into the desired shape, baked to a temperature of about 600° to 1,000° C for a period of 5 to 60 days to carbonize the binder, and then fired to a temperature of 2,200° C or higher to graphitize the baked article. More specific details of graphite electrode manufacture are found in the Kirk-Othmer Encyclopedia of Chemical Technology, Vol. 4, Second Edition, pages 158 to 200.

As a specific example of the manner in which the raw batch composition of this invention is converted into an improved graphite article, the composition identified as Example 1 in Table I was mixed in a sigma-blade mixer at a temperature of 135° C for 60 min. The mixed composition was allowed to cool slightly to congeal the binder and then extruded into 5.5 in. diameter electrodes. The electrodes were then baked at a temperature of 750° C for 20 days to carbonize the binder and then fired at a temperature of 2,750° C for 28 hours using conventional equipment and techniques, as described in the aforementioned Kirk-Othmer encyclopedia.

All of the examples in Table I were processed in a manner similar to that set forth for Example 1. The electrodes were tested and exhibited the proporties shown in Table II.

TABLE II

| Example No. | Average Density (g./cc.) | Sp. Res. $\times 10^{-3}$ ohm-in. Long | Sp. Res. $\times 10^{-3}$ ohm-in. Trans. | FS (p.s.i.) | CTE $\times 10^{-6}$/°C. Trans. |
|---|---|---|---|---|---|
| 1 | 1.609 | 45.5 | 94.5 | 2394 | 3.10 |
| 2 | 1.559 | 30.8 | 59.8 | 1778 | 3.87 |
| 3 | 1.632 | 41.8 | 134.0 | 3123 | 3.20 |
| 4 | 1.565 | 51.6 | — | 1372 | 4.14 |
| 5 | 1.492 | 32.3 | 62.2 | 1903 | 4.08 |
| 6 | 1.497 | 30.7 | 64.4 | 1896 | 4.16 |
| 7 | 1.474 | 32.6 | 66.6 | 1796 | 4.22 |
| 8 | 1.499 | 33.6 | 65.0 | 904 | 4.10 |

Examples 5, 6, and 7 of Tables I and II were made from compositions with a pitch binder and no additive. It can be seen that the transverse coefficient of thermal expansion (CTE) was in the range of about 4.1 to 4.2, and the flexural strength was in the range of 1,800 – 1,900 psi. By the addition of 12.2 percent chlorinated terphenyl based on the total weight of the binder, the CTE was reduced to 3.10 (a reduction of about 25 percent), and the flexural strength increased to 2,394 psi. It should be noted in Example 4, however, that when the chlorinated terphenyl reached 50 percent by weight of total binder, the CTE has returned to approximately the same value as when pitch alone formed the binder. The test results illustrated in Table II, and other data not reproduced here, have determined the beneficial range of chlorinated polyphenyls to be about 5 to 50 percent of the total weight of the binder.

It has also been established that best results are obtained when the chlorinated polyphenyls have relatively high concentrations of chlorine. For example, note that in Example 8 where the polyphenyl was unchlorinated, the transverse CTE approached the CTE of Examples 5, 6, and 7 which used the pitch binder, and the flexural strength was drastically reduced. It is preferred that the chlorine content be at least 50 percent of the total weight of the chlorinated polyphenyl, although lower amounts such as 40 percent chlorine will produce beneficial results.

Analysis of graphite electrodes made from compositions which contain chlorinated polyphenyls have established that most, if not all, of the chlorine present in the original compositions is lost during the baking and graphitizing process.

In addition to the improvement in the above-discussed physical properties, electrodes made in accordance with this invention exhibit higher coking values, coking values being defined as the ratio of the weight of coked pitch in the baked body to the weight of the pitch in the unbaked body.

Obviously many modifications and variations of the present invention are possible in light of the above teachings. It is therefore to be understood that within the scope of the impending claims the invention may be practiced otherwise than as specifically described.

We claim:

1. A method for producing a graphite article displaying a low coefficient of thermal expansion and high flexural strength, comprising in sequence the steps of: mixing a carbonaceous filler material and a binder of pitch together with about 12 percent by weight of said pitch of an additive selected from a chlorinated biphenyl and a chlorinated terphenyl, each having a chlorine content of at least 50 percent based on the total weight of said additive, to form a raw batch composition, said mixing step being for a time and at a temperature sufficient to secure complete miscibility of the pitch and chlorinated additive; thereafter forming said raw batch composition into an article of the desired size and shape; baking the formed article to carbonize the binder; and firing the thus baked article to form a finished graphite article.

2. A method in accordance with claim 1 wherein said mixing is conducted at a temperature of from about 70° to 200° C for a time duration of from about 20 to 120 minutes.

* * * * *